United States Patent
Ouellet et al.

(10) Patent No.: US 12,541,739 B2
(45) Date of Patent: Feb. 3, 2026

(54) SYSTEMS AND METHODS FOR PROBABILISTIC ESTIMATION IN TREE-BASED FORECAST MODELS

(71) Applicant: Kinaxis Inc., Ottawa (CA)

(72) Inventors: Sebastien Ouellet, Ottawa (CA); Leila Mousapour, Ottawa (CA); Andrii Stepura, Ottawa (CA)

(73) Assignee: Kinaxis Inc., Ottawa (CA)

(*) Notice: Subject to any disclaimer, the term of this patent is extended or adjusted under 35 U.S.C. 154(b) by 371 days.

(21) Appl. No.: 18/180,418

(22) Filed: Mar. 8, 2023

(65) Prior Publication Data
US 2023/0289721 A1   Sep. 14, 2023

Related U.S. Application Data

(60) Provisional application No. 63/325,678, filed on Mar. 31, 2022, provisional application No. 63/317,600, filed on Mar. 8, 2022.

(51) Int. Cl.
*G06Q 10/087* (2023.01)
*G06Q 30/0202* (2023.01)

(52) U.S. Cl.
CPC ....... *G06Q 10/087* (2013.01); *G06Q 30/0202* (2013.01)

(58) Field of Classification Search
CPC .......................... G06Q 10/087; G06Q 30/0202
USPC .......................................................... 705/28
See application file for complete search history.

(56) References Cited

U.S. PATENT DOCUMENTS

| | | | |
|---|---|---|---|
| 6,970,841 B1 | 11/2005 | Cheng et al. | |
| 7,660,705 B1 | 2/2010 | Meek et al. | |
| 10,318,669 B2 | 6/2019 | Freeman et al. | |
| 10,552,217 B2 | 2/2020 | Baughman et al. | |
| 2017/0308846 A1* | 10/2017 | de Mars | G06N 5/04 |
| 2019/0034385 A1 | 1/2019 | Kawahara et al. | |
| 2019/0034386 A1 | 1/2019 | Kawahara et al. | |
| 2019/0164084 A1 | 5/2019 | Gulin | |
| 2021/0043309 A1* | 2/2021 | Tiwari | G06N 20/00 |
| 2021/0110298 A1* | 4/2021 | Bisson-Krol | G06N 20/00 |
| 2021/0342698 A1 | 11/2021 | Ouellet et al. | |

FOREIGN PATENT DOCUMENTS

CA   3059932 A1   4/2021

OTHER PUBLICATIONS

International Patent Application No. PCT/CA2023/050303, International Search Report and Written Opinion, dated May 26, 2023.

* cited by examiner

*Primary Examiner* — Garcia Ade
(74) *Attorney, Agent, or Firm* — Ruggiero McAllister & McMahon LLC

(57) ABSTRACT

Systems and methods in which a historical data set is pre-processed once per trained machine-learning model; a value of an unknown sample is forecast while tracking a leaf path of the unknown sample; the leaf path of the unknown sample is limited to a subset of trees in each trained-machine model; a set of related historical samples is determined based on the leaf path of the unknown sample, and a set of quantiles is determined from the leaf path of the unknown sample. Inventory is loaded according to the set of quantiles.

30 Claims, 9 Drawing Sheets

SYSTEMS AND METHODS FOR PROBABILISTIC ESTIMATION IN TREE-BASED FORECAST MODELS

This application claims priority on both U.S. Ser. No. 63/317,600 filed Mar. 8, 2022; and U.S. Ser. No. 63/325,678 filed Mar. 31, 2022, the disclosure of both of which are hereby incorporated by reference in their entirety.

BACKGROUND

From a technical perspective, the conventional approach to forecasting a range (rather than a single point) in a machine learning model, is to use traditional time series models, such as Autoregressive Integrated Moving Average (ARIMA), since these inherently produce prediction intervals. However, ARIMA models are not always accurate, and can be computationally unstable. Other conventional approaches for forecasting a range of values (rather than a single point), include neural networks and Bayesian models. However, these have the drawback in that they are expensive and harder to tune. In fact, all of the conventional approaches for forecasting a range of values, require more data, more run-time, and are overall, computationally resource-intensive.

This range of forecasts (also called "probabilistic forecasts") has practical applications in a variety of fields. One such field is supply chain planning. Supply chain planners need more information than point estimate forecasts to effectively plan for demand surges or declines, as well as information about the trade-off between increasing the service level at specific locations and the impact on the quantity required to achieve specific service levels.

For example, the amount of inventory to hold can be calculated based on the variation of historical demand. Such a variation can depend on many factors, which makes the variation, or range, both difficult and computationally intensive to forecast.

This extra information can be computationally intensive to produce. This information should also be statistically consistent with all forecasts visible to the users. The point estimate forecast that is the best estimate of the demand should consistently be close to the 50th quantile of demand, and as an example the 55th quantile should consistently be lower than the 60th quantile of demand.

The greater the accuracy in forecasting the variation of a demand, leads to a more cost-efficient loading of inventory, which thereby reduces inventory costs.

There is thus a need to provide a range of forecasts in machine learning, in a manner that is computationally efficient.

BRIEF SUMMARY

While tree-based models are computationally efficient and fast, conventional uses of tree-based models do not forecast a range of values. That is, conventional use of tree-based models does not provide a probability of forecasts.

However, systems and methods disclosed herein, use tree-based models in a non-conventional approach that results in probability forecasts. Furthermore, such a unique approach is less data-intensive, requires less run-time and is more computationally efficient than the Bayesian models, neural networks and traditional time series models used for probability forecasts.

The systems and methods disclosed herein relate to an estimation of the probability of a forecasted quantity. The systems and methods disclosed herein may be presented in two parts. One part relates to systems and methods of estimating the probability of a forecasted value.

A second, optional use case afforded by the first part, discloses systems and methods where values used by a process are optimized. In both parts, there is no restriction as to the context of the values. While there is no restriction as to the context of the quantities, non-limiting examples in the field of supply chain management are provided.

In one aspect, a computer-implemented method includes: pre-processing, by a processor, a historical data set the pre-processing executed once per trained machine-learning model; forecasting, by the processor, a value of an unknown sample while tracking a leaf path of the unknown sample; limiting, by the processor, the leaf path of the unknown sample to a subset of trees in each trained-machine model; determining, by the processor, a set of related historical samples based on the leaf path of the unknown sample; and determining, by the processor, a set of quantiles from the leaf path of the unknown sample.

In the computer-implemented method, pre-processing the historical data set may also include: training, by the processor, a tree-based machine learning model; making, by the processor, a forecast for the historical data set; tracking, by the processor, one or more leaf paths associated with the forecast for the historical data set; and creating, by the processor, a group of similar samples in the historical data set at each branch of the tree-based machine learning model.

In the computer-implemented method, determining the set of related historical samples may also include: determining, by the processor, a subset of frequently-repeating training samples from the historical data set, on the leaf path of the unknown sample; estimating, by the processor, a probability density function for the leaf path of the unknown sample; generating, by the processor, a set of synthetic values from the probability density function; computing, by the processor, the quantiles based on specified service levels and the set of synthetic values; and outputting, by the processor, a quantile forecast for the unknown sample.

The computer-implemented method may also include loading inventory in accordance with the set of quantiles. Other technical features may be readily apparent to one skilled in the art from the following figures, descriptions, and claims.

In one aspect, a system includes a processor. The system also includes a memory storing instructions that, when executed by the processor, configure the system: to pre-process, by the processor, a historical data set the pre-processing executed once per trained machine-learning model; forecast, by the processor, a value of an unknown sample while tracking a leaf path of the unknown sample; limit, by the processor, the leaf path of the unknown sample to a subset of trees in each trained-machine model; determine, by the processor, a set of related historical samples based on the leaf path of the unknown sample; and determine, by the processor, a set of quantiles from the leaf path of the unknown sample.

The system may also, when pre-processing the historical data set, be further configured to: train, by the processor, a tree-based machine learning model; make, by the processor, a forecast for the historical data set; track, by the processor, one or more leaf paths associated with the forecast for the historical data set; and create, by the processor, a group of similar samples in the historical data set at each branch of the tree-based machine learning model.

The system may also, when determining the set of related historical samples, be further configured to: determine, by the processor, a subset of frequently-repeating training samples from the historical data set, on the leaf path of the unknown sample; estimate, by the processor, a probability density function for the leaf path of the unknown sample; generate, by the processor, a set of synthetic values from the probability density function; compute, by the processor, the quantiles based on specified service levels and the set of synthetic values; and output, by the processor, a quantile forecast for the unknown sample.

The system may also, when training the tree-based model, be further configured to: prepare, by the processor, the historical data set for training; define, by the processor, a target variable, select, by the processor, a set of features; and build, by the processor, a decision tree.

The system may also be configured to load inventory in accordance with the set of quantiles. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: pre-process, by a processor, a historical data set the pre-processing executed once per trained machine-learning model; forecast, by the processor, a value of an unknown sample while tracking a leaf path of the unknown sample; limit, by the processor, the leaf path of the unknown sample to a subset of trees in each trained-machine model; determine, by the processor, a set of related historical samples based on the leaf path of the unknown sample; and determine, by the processor, a set of quantiles from the leaf path of the unknown sample.

The computer-readable storage medium may also include, when pre-processing the historical data set, instructions that when executed by the computer, further cause the computer to: train, by the processor, a tree-based machine learning model; make, by the processor, a forecast for the historical data set, track, by the processor, one or more leaf paths associated with the forecast for the historical data set; and create, by the processor, a group of similar samples in the historical data set at each branch of the tree-based machine learning model.

In the computer-readable storage medium may also include, when training the tree-based model may also include instructions that when executed by the computer, further cause the computer to: prepare, by the processor, the historical data set for training; define, by the processor, a target variable; select, by the processor, a set of features; and build, by the processor, a decision tree.

The computer-readable storage medium may also include, when determining the set of related historical samples, instructions that when executed by the computer, further cause the computer to: determine, by the processor, a subset of frequently-repeating training samples from the historical data set, on the leaf path of the unknown sample; estimate, by the processor, a probability density function for the leaf path of the unknown sample; generate, by the processor, a set of synthetic values from the probability density function; compute, by the processor, the quantiles based on specified service levels and the set of synthetic values; and output, by the processor, a quantile forecast for the unknown sample.

The computer-readable storage medium may also include instructions that when executed by the computer, further cause the computer to load inventory in accordance with the set of quantiles. Other technical features may be readily apparent to one skilled in the art from the following figures, descriptions, and claims.

In one aspect, a computer-implemented method, includes: pre-processing, by a processor, a historical data set associated with a plurality of stores and a plurality of products, the pre-processing executed once per trained machine-learning model; forecasting, by the processor, a value of an unknown sample while tracking a leaf path of the unknown sample; limiting, by the processor, the leaf path of the unknown sample to a subset of trees in each trained-machine model; determining, by the processor, a set of related historical samples based on the leaf path of the unknown sample; determining, by the processor, a set of quantiles across the plurality of stores from the leaf path of the unknown sample; constructing, by the processor, one or more tradeoff curve functions for each combination of the plurality of products and stores from the set of quantiles; constructing, by the processor, an objective function that accepts a quantity per store and computes a metric from the one or more tradeoff curves; and determining, by the processor, a set of quantities across the plurality of stores that maximize the metric while being constrained by a maximum available quantity.

In the computer-implemented method, pre-processing the historical data set may also include: training, by the processor, a tree-based machine learning model; making, by the processor, a forecast for the historical data set; tracking, by the processor, one or more leaf paths associated with the forecast for the historical data set; and creating, by the processor, a group of similar samples in the historical data set at each branch of the tree-based machine learning model.

In the computer-implemented method, determining the set of related historical samples may also include: determining, by the processor, a subset of frequently-repeating training samples from the historical data set, on the leaf path of the unknown sample, estimating, by the processor, a probability density function for the leaf path of the unknown sample, generating, by the processor, a set of synthetic values from the probability density function, computing, by the processor, the quantiles based on specified service levels and the set of synthetic values, and outputting, by the processor, a quantile forecast for the unknown sample.

The computer-implemented method may also include further include loading inventory at each of the plurality of stores in accordance with the set of quantities. Other technical features may be readily apparent to one skilled in the art from the following figures, descriptions, and claims.

In one aspect, a system includes a processor. The system also includes a memory storing instructions that, when executed by the processor, configure the system to: pre-process, by the processor, a historical data set associated with a plurality of stores and a plurality of products, the pre-processing executed once per trained machine-learning model; forecast, by the processor, a value of an unknown sample while tracking a leaf path of the unknown sample; limit, by the processor, the leaf path of the unknown sample to a subset of trees in each trained-machine model; determine, by the processor, a set of related historical samples based on the leaf path of the unknown sample, determine, by the processor, a set of quantiles across the plurality of stores from the leaf path of the unknown sample; construct, by the processor, one or more tradeoff curve functions for each combination of the plurality of products and stores from the set of quantiles; construct, by the processor, an objective function that accepts a quantity per store and computes a metric from the one or more tradeoff curves; and determine, by the processor, a set of quantities across the plurality of stores that maximize the metric while being constrained by a maximum available quantity.

The system may also, when pre-processing the historical data set, be further configured to: train, by the processor, a tree-based machine learning model; make, by the processor, a forecast for the historical data set; track, by the processor, one or more leaf paths associated with the forecast for the historical data set; and create, by the processor, a group of similar samples in the historical data set at each branch of the tree-based machine learning model.

The system may also, when determining the set of related historical samples, be further configured to: determine, by the processor, a subset of frequently-repeating training samples from the historical data set, on the leaf path of the unknown sample; estimate, by the processor, a probability density function for the leaf path of the unknown sample; generate, by the processor, a set of synthetic values from the probability density function; compute, by the processor, the quantiles based on specified service levels and the set of synthetic values; and output, by the processor, a quantile forecast for the unknown sample.

The system may also, when training the tree-based model, be further configured: to prepare, by the processor, the historical data set for training; define, by the processor, a target variable; select, by the processor, a set of features; and build, by the processor, a decision tree.

The system may also be configured to generate instructions to load inventory at each of the plurality of stores in accordance with the set of quantities. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: pre-process, by a processor, a historical data set associated with a plurality of stores and a plurality of products, the pre-processing executed once per trained machine-learning model; forecast, by the processor, a value of an unknown sample while tracking a leaf path of the unknown sample; limit, by the processor, the leaf path of the unknown sample to a subset of trees in each trained-machine model; determine, by the processor, a set of related historical samples based on the leaf path of the unknown sample; determine, by the processor, a set of quantiles across the plurality of stores from the leaf path of the unknown sample; construct, by the processor, one or more tradeoff curve functions for each combination of the plurality of products and stores from the set of quantiles; construct, by the processor, an objective function that accepts a quantity per store and computes a metric from the one or more tradeoff curves; and determine, by the processor, a set of quantities across the plurality of stores that maximize the metric while being constrained by a maximum available quantity.

The computer-readable storage medium may also, when pre-processing the historical data set, include instructions that when executed by the computer, further cause the computer to: train, by the processor, a tree-based machine learning model; make, by the processor, a forecast for the historical data set; track, by the processor, one or more leaf paths associated with the forecast for the historical data set; and create, by the processor, a group of similar samples in the historical data set at each branch of the tree-based machine learning model.

The computer-readable storage medium may also, when determining the set of related historical samples, include instructions that when executed by the computer, further cause the computer to: determine, by the processor, a subset of frequently-repeating training samples from the historical data set, on the leaf path of the unknown sample; estimate, by the processor, a probability density function for the leaf path of the unknown sample; generate, by the processor, a set of synthetic values from the probability density function; compute, by the processor, the quantiles based on specified service levels and the set of synthetic values; and output, by the processor, a quantile forecast for the unknown sample.

The computer-readable storage medium may also include instructions that when executed by the computer, further cause the computer to generate instructions to load inventory at each of the plurality of stores in accordance with the set of quantities. Other technical features may be readily apparent to one skilled in the art from the following figures, descriptions, and claims.

The computer-implemented method may, when training the tree-based model, include instructions that when executed by the computer, further cause the computer to: prepare, by the processor, the historical data set for training; defining, by the processor, a target variable, selecting, by the processor, a set of features, and building, by the processor, a decision tree.

The computer-readable storage medium may also, when training the tree-based model, include instructions that when executed by the computer, further cause the computer to: prepare, by the processor, the historical data set for training; define, by the processor, a target variable; select, by the processor, a set of features; and build, by the processor, a decision tree.

The computer-readable storage medium may also, when training the tree-based model, include instructions that when executed by the computer, further cause the computer to: prepare, by the processor, the historical data set for training; define, by the processor, a target variable; select, by the processor, a set of features; and build, by the processor, a decision tree. Other technical features may be readily apparent to one skilled in the art from the following figures, descriptions, and claims.

In one aspect, a method, includes: training, by a processor, a tree-based machine learning model; making, by the processor, a forecast for the historical data set; tracking, by the processor, one or more leaf paths associated with the forecast for the historical data set; creating, by the processor, a group of similar samples in the historical data set at each branch of the tree-based machine learning model; forecasting, by the processor, a value of an unknown sample while tracking a leaf path of the unknown sample; limiting, by the processor, the leaf path of the unknown sample to a subset of trees in each trained-machine model; determining, by the processor, a set of related historical samples based on the leaf path of the unknown sample; determining, by the processor, a set of quantiles from the leaf path of the unknown sample; and loading inventory in accordance with the set of quantiles.

In the method, training the tree-based model may also include: preparing, by the processor, the historical data set for training; defining, by the processor, a target variable; selecting, by the processor, a set of features; and building, by the processor, a decision tree.

In the method, determining the set of related historical samples may include: determining, by the processor, a subset of frequently-repeating training samples from the historical data set, on the leaf path of the unknown sample; estimating, by the processor, a probability density function for the leaf path of the unknown sample; generating, by the processor, a set of synthetic values from the probability density function; computing, by the processor, the quantiles based on specified service levels and the set of synthetic values; and outputting, by the processor, a quantile forecast for the unknown sample. Other technical features may be readily apparent to one skilled in the art from the following figures, descriptions, and claims.

In one aspect, a system includes a processor. The system also includes a memory storing instructions that, when executed by the processor, configure the system to: train, by a processor, a tree-based machine learning model; make, by the processor, a forecast for the historical data set; track, by the processor, one or more leaf paths associated with the forecast for the historical data set; create, by the processor, a group of similar samples in the historical data set at each branch of the tree-based machine learning model; forecast, by the processor, a value of an unknown sample while tracking a leaf path of the unknown sample; limit, by the processor, the leaf path of the unknown sample to a subset of trees in each trained-machine model; determine, by the processor, a set of related historical samples based on the leaf path of the unknown sample; determine, by the processor, a set of quantiles from the leaf path of the unknown sample; and load inventory in accordance with the set of quantiles.

The system may also, when training the tree-based model, be configured to: prepare, by the processor, the historical data set for training; define, by the processor, a target variable; select, by the processor, a set of features; and build, by the processor, a decision tree.

The system may also, when determining the set of related historical samples, be configured to: determine, by the processor, a subset of frequently-repeating training samples from the historical data set, on the leaf path of the unknown sample; estimate, by the processor, a probability density function for the leaf path of the unknown sample; generate, by the processor, a set of synthetic values from the probability density function; compute, by the processor, the quantiles based on specified service levels and the set of synthetic values; and output, by the processor, a quantile forecast for the unknown sample. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: train, by a processor, a tree-based machine learning model; make, by the processor, a forecast for the historical data set; track, by the processor, one or more leaf paths associated with the forecast for the historical data set; create, by the processor, a group of similar samples in the historical data set at each branch of the tree-based machine learning model; forecast, by the processor, a value of an unknown sample while tracking a leaf path of the unknown sample; limit, by the processor, the leaf path of the unknown sample to a subset of trees in each trained-machine model; determine, by the processor, a set of related historical samples based on the leaf path of the unknown sample; determine, by the processor, a set of quantiles from the leaf path of the unknown sample; and load inventory in accordance with the set of quantiles.

The computer-readable storage medium may also, when training the tree-based model include instructions that when executed by the computer, further cause the computer to: prepare, by the processor, the historical data set for training; define, by the processor, a target variable; select, by the processor, a set of features; and build, by the processor, a decision tree.

The computer-readable storage medium may also, when determining the set of related historical samples, include instructions that when executed by the computer, further cause the computer to: determine, by the processor, a subset of frequently-repeating training samples from the historical data set, on the leaf path of the unknown sample; estimate, by the processor, a probability density function for the leaf path of the unknown sample; generate, by the processor, a set of synthetic values from the probability density function; compute, by the processor, the quantiles based on specified service levels and the set of synthetic values; and output, by the processor, a quantile forecast for the unknown sample. Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Like reference numbers and designations in the various drawings indicate like elements.

DETAILED DESCRIPTION

Figure 1:
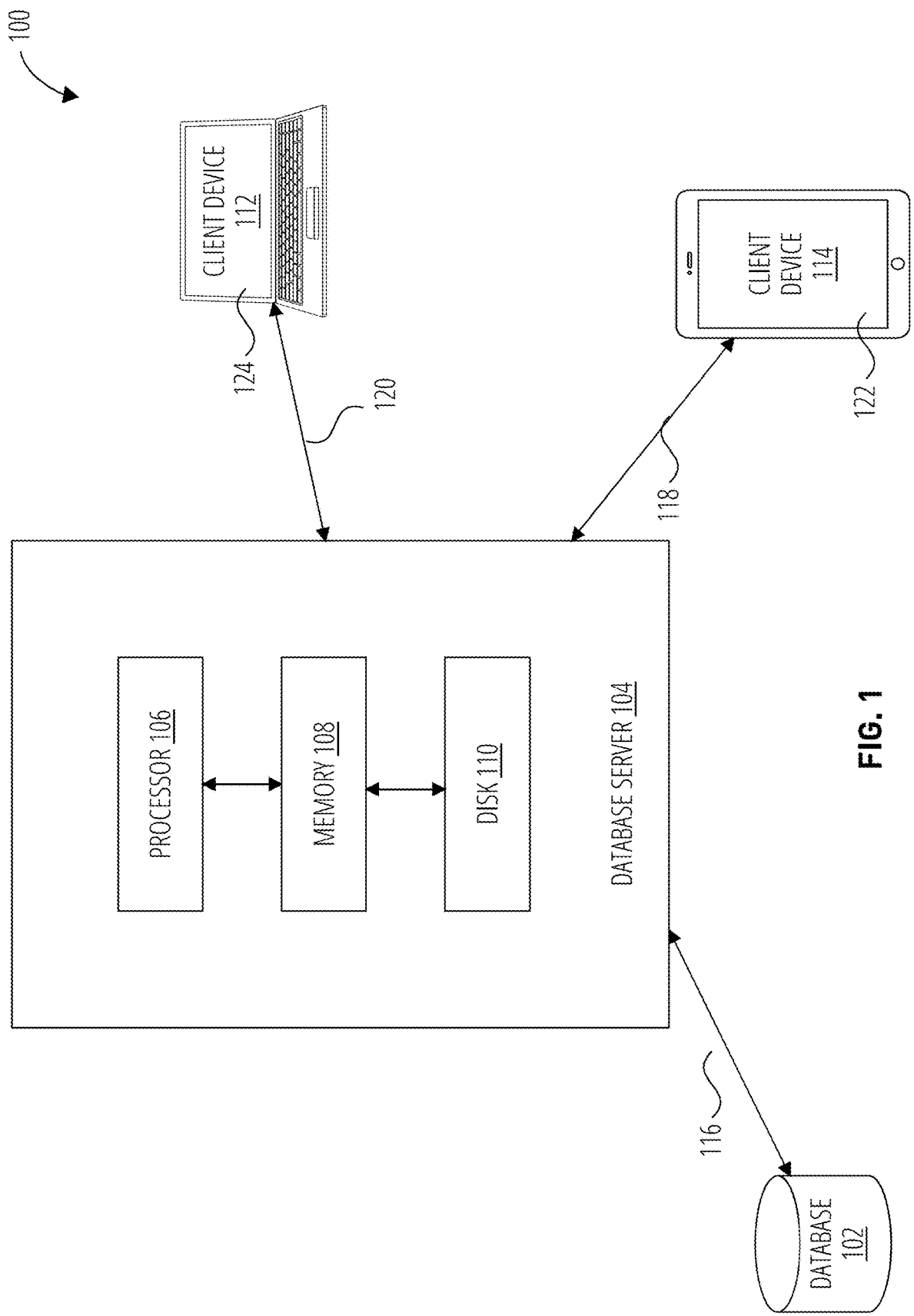
FIG. 1 illustrates an example of a system for probabilistic estimation in tree-based forecast models in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for probabilistic estimation in tree-based forecast models.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

From a technical perspective, the conventional approach to forecasting a range (rather than a single point) in a machine-learning model, is to use traditional time series models, such as Autoregressive Integrated Moving Average (ARIMA), since it inherently produces prediction intervals. However, ARIMA models are not always accurate, and can be computationally unstable. Other conventional approaches for forecasting a range of values (rather than a single point), include neural networks and Bayesian machine-learning models. However, these have the drawback in that they are expensive and harder to tune. In fact, all of the conventional approaches for forecasting a range of values, require more data, more run-time, and are overall, computationally resource-intensive.

On the other hand, while tree-based machine-learning models are computationally efficient and fast, conventional uses of tree-based machine-learning models do not forecast a range. That is, conventional use of tree-based machine-learning models does not provide a probability of forecasts. It is therefore not obvious, that tree-based machine-learning models can be used to provide a probability of forecasts.

However, systems and methods disclosed herein, use tree-based models in a non-conventional way that results in probability forecasts. Furthermore, such a unique approach is less data-intensive, requires less run-time and is more computationally efficient than the Bayesian models, neural networks and traditional time series machine-learning models.

The systems and methods disclosed herein relate to an estimation of the probability of a forecasted quantity. The systems and methods disclosed herein may be presented in two parts. One part relates to systems and methods of estimating the probability of a forecasted value. A second, optional use case afforded by the first part, discloses systems and methods where values used by a process are optimized.

In both parts, there is no restriction as to the context of the values. While there is no restriction as to the context of the quantities, non-limiting examples in the field of supply chain management are provided.

The systems and methods disclosed herein that relate to the first part, can comprise: a trained tree-based forecast model; historical data; data characterizing the same time period as the historical data; a first module examining the decisions made by the forecast model and producing a data set; and a second module producing both probability distributions from the previous data set and the quantiles required by a user.

Systems and methods related to the optional use case can comprise: an optimization module using the quantiles to produce a set of recommendations.

The methods and systems disclosed herein are an improvement on conventional approaches by enhancing a number of features. For example, accuracy is enhanced, as a desired coverage probability is achieved with a short window of historical data. Simultaneously, since a short window of historical data is required (as opposed to conventional methods described above) less historical data is required for processing, thereby reducing both processing time and data storage.

In relation to applications in supply chains, historical data comprises, for example, historical sales data (quantity of units sold per product per store). Data characterizing the same time period as the historical sales data, can include, for example, promotions related to the products, store events, cultural events, and the like. The optimization module can use the quantiles to produce a set of safety stock recommendations across multiple stores dependent on the same stock constraint—as an example: one distribution center. In addition to enhancing accuracy and computational efficiency (as described above for the general case), there is enhanced consistency since there is reuse of modeling work completed by demand modules and production of predictions aligned with the demand forecasts.

An approach to uncertainty modelling can involve a tree-based forecasting model, which can be a simple decision tree for regression, or a more complex ensemble of several trees, such as random forest or gradient boosting.

The model may be first trained to predict a value of interest based on the data characterizing the associated historical period. Fit model can then be used to predict sales values for both the historical time period and the prediction horizon. For each of the predicted values and trees, the tree structure may be examined to determine the exact leaf the associated predictor values led to. Based on this information, the historical observations can be grouped with respect to the leaf for each of the estimators. Subsequently, related historical observations may be collected for each of the predicted values for the forecast horizon on the basis of the shared leaf in each of the trees. The probability density functions (PDFs) for the predictions can be computed by applying Gaussian kernel density estimation to the representative observations. Quantile predictions may then be derived from the estimated PDFs. These are further described in FIG. 2-FIG. 7.

The presented approach ensures consistency of the derived quantile predictions, as they are obtained from the same distributions. This can be identified as an advantage over a quantile regression method that involves fitting different models for each of the quantile objectives, and hence does not guarantee the consistency between quantile forecasts.

Figure 2:
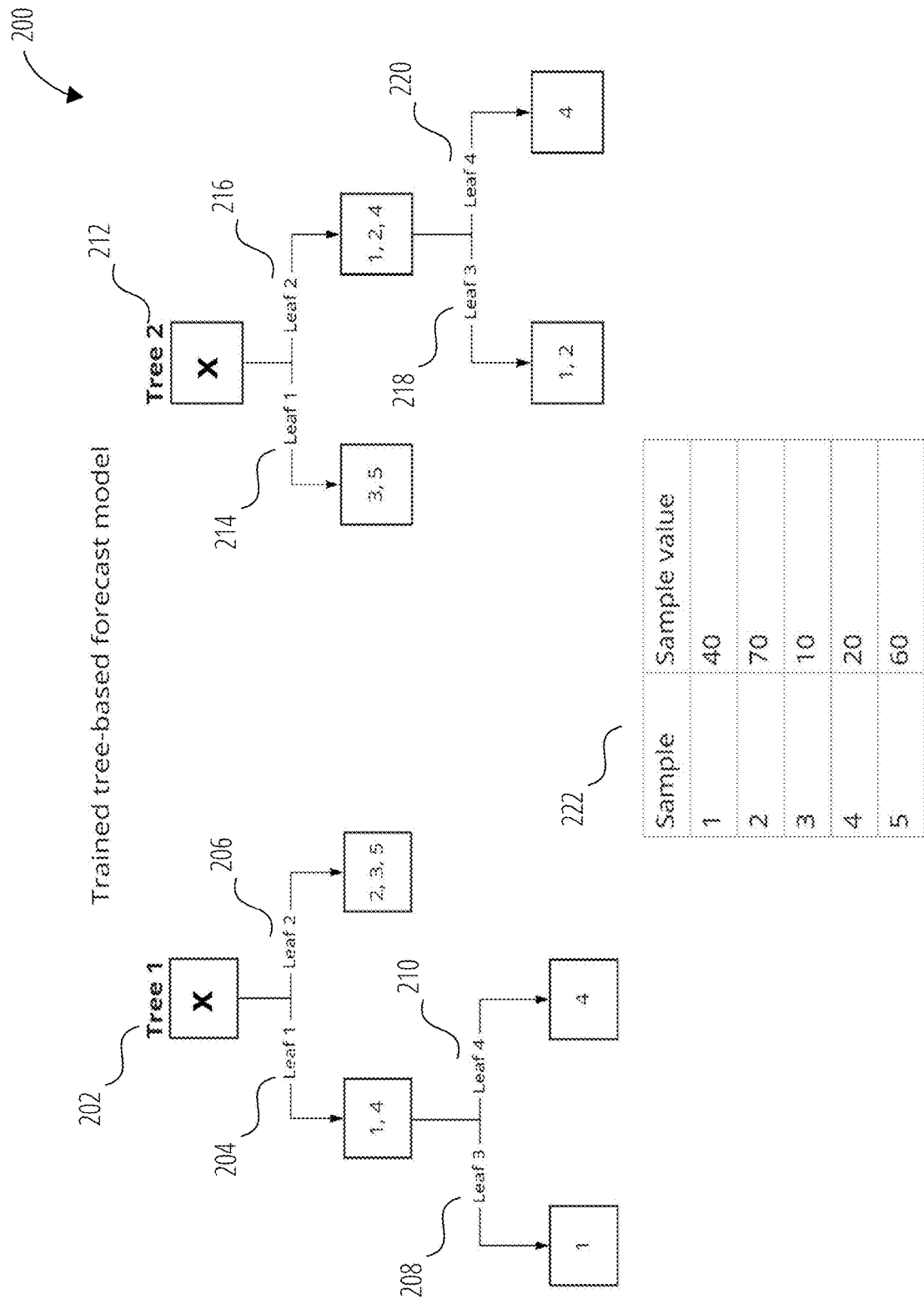
FIG. 2 illustrates a trained tree-based forecast model in accordance with one embodiment.

FIG. 2 illustrates a trained tree-based forecast model 200 in accordance with one embodiment.

The structure of Tree 202 is as follows. At the first level of branching, there are two leaves: Leaf 204 and Leaf 206. Each of Leaf 204 and 206 are separated according to a respective feature. For example, Leaf 204 can indicate that a sample value occurred on a weekend (that is, Saturday and Sunday), while Leaf 206 can indicate that a sample value occurred on a weekday (that is, Monday-Friday). There is a second branch at Leaf 204, giving rise to Leaf 208 and Leaf 210, each of which is distinguished by a respective feature. For example, Leaf 208 can indicate that a sample value occurred on a Saturday, while Leaf 210 can indicate that a sample value occurred on a Sunday.

The structure of Tree 212 is as follows. At the first level of branching, there are two leaves: Leaf 214 and Leaf 216. Each of Leaf 214 and Leaf 216 are separated according to a respective feature. For example, Leaf 214 can indicate that a sample value occurred in the first half of the year (that is, January-June), while Leaf 216 can indicate that a sample value occurred in the second half of the year (that is, July-December). There is a second branch at Leaf 216, giving rise to Leaf 218 and Leaf 220, each of which is distinguished by a respective feature. For example, Leaf 218 can indicate that a sample value occurred in the third quarter (that is, July-September), while Leaf 220 can indicate that a sample value occurred in the fourth quarter (that is, October-December).

The illustration of Tree 202 also shows data that is used for training a tree-based forecast model. Namely, sample values 1-5 (shown in sample value table 222), in which Sample 1 has a value of 40; Sample 2 has a value of 70; Sample 3 has a value of 10; Sample 4 has a value of 20; and Sample 5 has a value of 60. Each sample also has associated with it, a set of features (which are not shown in sample value table 222). For example, these features can indicate information about the sample value: when it occurred, its geographical location; financial market conditions, etc. Examples of features can include the day of the week, the month, the quarter, the year, seasonal conditions (summer, fall, winter, spring), proximity to a holiday, climate conditions, stock market indices, etc. Historical data is sorted by each tree, according to the data's features.

Each sample is then processed through Tree 202. For example, after the first branch, samples 1 and 4 are closer with respect to a first feature than samples 2, 3 and 5, while samples 2, 3 and 5 are mutually closer with respect to a second feature than samples 1 and 4. As an example, suppose Tree 202 samples a subset of features related to the time of occurrence, such that Leaf 204 is for all occurrences on a weekend, while Leaf 206 is for all occurrences on a weekday. According to FIG. 2, samples 1 and 4 are grouped together (in Leaf 204) since they each have a weekend as a feature, whereas samples 2, 3 and 5 are grouped together (in Leaf 206) since they each have a weekday as a feature. At the next branch level, Leaf 208 is associated with a third feature, while Leaf 210 is associated with a fourth feature. Continuing the aforementioned example, if Leaf 208 indicates occurrence on a Saturday, and Leaf 210 indicates occurrence on a Sunday, then sample 1 is grouped in Leaf 208 since it has Saturday as a feature, whereas sample 4 is grouped in Leaf 220 since it has Sunday as a feature.

Each sample can then also be processed through Tree 212. For example, after the first branch, samples 3 and 5 are closer with respect to a first feature than samples 1, 2 and 4, while samples 1, 2 and 4 are mutually closer with respect to a second feature than samples 3 and 5. As an example, suppose Tree 212 samples a subset of features related to time of occurrence, such that Leaf 214 is for all occurrences in the first six months (January-June), while Leaf 216 is for all occurrences in the last six months (July-December). According to FIG. 2, samples 3 and 5 are grouped together (in Leaf 214) since they each occur during the first six months as a feature, whereas samples 1, 2 and 4 are grouped together (in Leaf 216) since they occur during the last six months as a feature. At the next branch level, Leaf 218 is associated with a third feature, while Leaf 220 is associated with a fourth feature. Continuing the aforementioned example, if Leaf 218 indicates occurrence in the third quarter (July-September), and Leaf 220 indicates occurrence in the fourth quarter (October-December) then samples 1 and 2 are grouped in Leaf 218 since they each have the third quarter as a feature, whereas sample 4 is grouped in Leaf 220 since it has the fourth quarter as a feature.

In FIG. 2, the entity marked 'X' refers to a sample with an unknown sample value. The sample 'X" can be used by the trained tree-based forecast model 200 to forecast a sample value within a confidence interval.

In FIG. 2, while two trees are provided as examples, it is understood that the model incorporates a far greater number of trees, numbering in the hundreds, thousands, tens-of-thousands, etc. Furthermore, each tree can include any number of branches, while each tree can use different subsets of features of all the data present.

Figure 3:
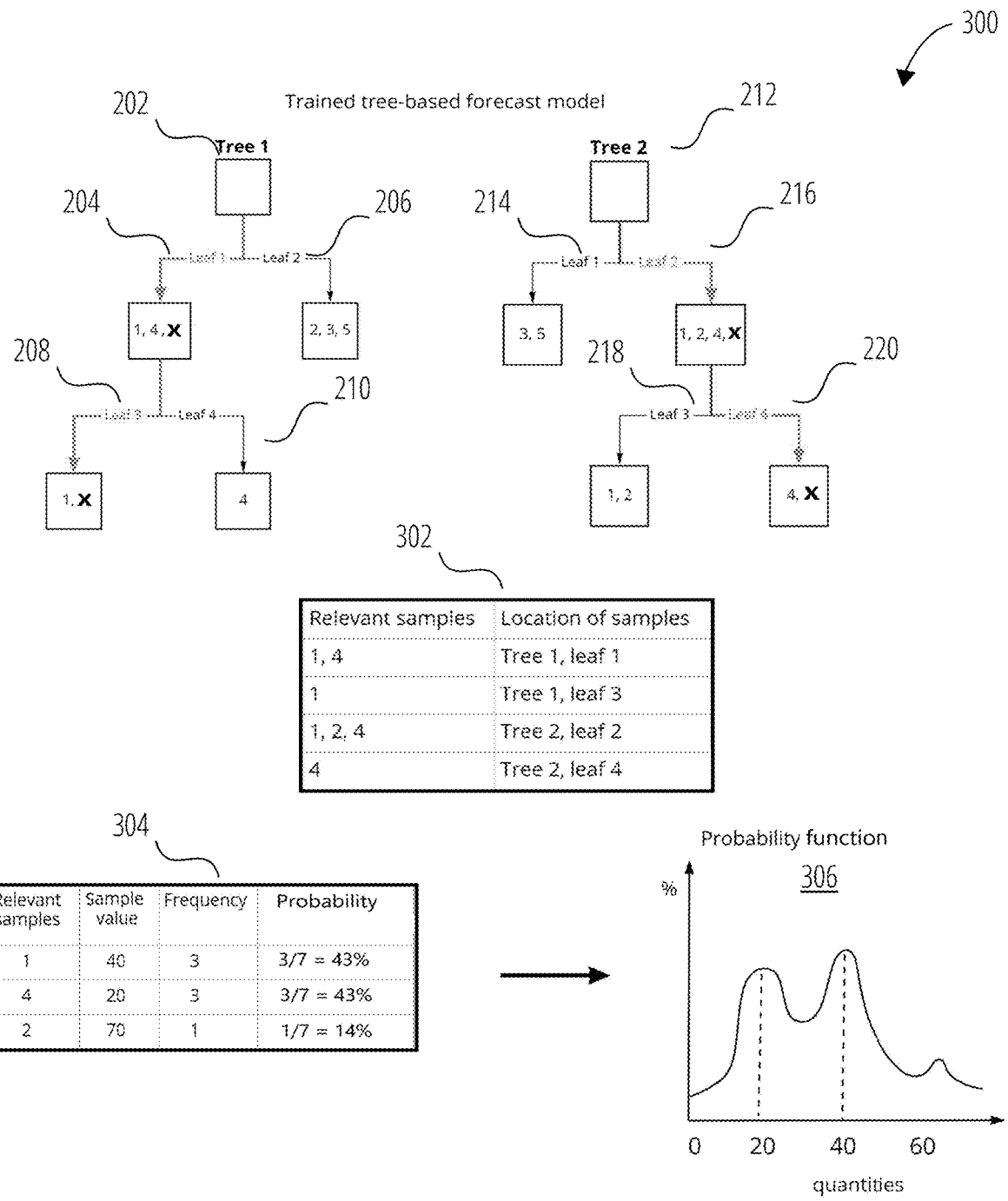
FIG. 3 illustrates further aspects of the trained tree-based forecast model shown in FIG. 2.

FIG. 3 illustrates further aspects 300 of the trained tree-based forecast model 200 shown in FIG. 2.

The forecast of sample 'X' is shown in each of Tree 202 and Tree 212, based on the features associated with sample 'X'. A forecast of sample 'X' is made for each tree, by placing sample 'X' in the appropriate leaf at each branch, according to the feature of sample 'X', until the final branch level is attained.

With respect to Tree 202, at the first branch, sample 'X' is placed in Leaf 204 (according to the features of sample 'X'), along with historical data samples 1 and 4. At the second subsequent branch, sample 'X' is placed in Leaf 208, along with historical data sample 1.

With respect to Tree 212, at the first branch, sample 'X' is placed in Leaf 216 (according to the features of sample 'X'), along with historical data samples 1, 2 and 4. At the second subsequent branch, sample 'X' is placed in Leaf 220, along with historical data sample 4.

The path of sample 'X' in each tree is tracked. An example of tracking is shown in Tracking Table 302, which lists the relevant samples shared by 'X', and the associated location. For example, tracking the path of 'X' in Tree 202 shows that 'X' shares a location with samples 1 and 4 at Leaf 204, while also sharing a location with sample 1 at Leaf 208. Similarly, tracking the path of 'X' in Tree 212 shows that 'X' shares a location with samples 1, 3 and 4 at Leaf 216, while also sharing a location with sample 13 at Leaf 220.

The Tracking Table 302 then leads to a Frequency Table 304 of the sample values. For example, there are only three relevant samples that have been tracked (while forecasting sample 'X') according to the Tracking Table 302: samples 1, 2 and 4. These three samples are individually listed in the Frequency Table 304. Each relevant sample is listed, along with its sample value, and the number of times it occurs in the Tracking Table 302. For example, sample 1 (with a sample value of 40), occurs three times in Tracking Table 302; sample 4 (with a sample value of 20) occurs three times in Tracking Table 302; and sample 2 (with a sample value of 70) occurs once in Tracking Table 302. This frequency can be converted to an occurrence probability: Sample 'X' has a 43% probability of having a value of 40; a 43% probability of having a value 20; and a 14% probability of having a value of 70. These are the results for two trees, each having two branch levels.

In reality, a trained tree-based forecast model 200 has trees numbering in the hundreds, thousands, tens-of-thousands, and so on, while each tree can have any number of levels, while each tree can use different subsets of features of all the data present. This will lead to a continuous set of probabilities for the forecast of Sample 'X', as shown in the probability function 306, in which the highest probability values are at 20 and 40. The area under the probability curve is 100%.

Thus, FIG. 2 and FIG. 3 illustrate how a probability forecast can be derived from a trained tree-based forecast model. In simple terms, a decision-tree model, which only provides a single point prediction, is used. Correlation between a leaf path of an unknown sample and known data points in the decision-tree model is tracked. A probability forecast can then be obtained from the tracking, This can be generalized in the following outline of the steps that can be taken in systems and methods for probabilistic estimation in tree-based forecast models.

Let $n_{trn}$ be the number of historical data observations, and $n_{tst}$ be the size of the forecast window. The vector $y^{trn}=(y_1, \ldots, y_{trn})$ is a vector of nim historical data. Let $M^{trn}$ be a matrix of features characterizing the historical period, and $M^{tst}$ be a matrix of features for the prediction horizon. A tree-based model, $H=(h_1, \ldots, h_m)$ is a tuple of m estimators with each tree $h_j$ containing Leaves $(h_j)$ Leaves $(l_{j,1}, \ldots, l_{j, Leaves (hj)})$, where Leaves is a function that gives the number of leaves in the tree.

A computer-implemented process may comprise the following:

1) First, train the tree-based model H on historical data $M^{trn}$, $y^{trn}$;

2) Next, forecast values for both the historical time period and the prediction horizon: $\widetilde{y^{trn}} = H(M^{trn})$; $\widetilde{y^{tst}} = H(M^{tst})$ This second step is the step that refers to tracking the leaf path of the unknown sample 'X'. While the trained model already has been trained on the historical data, the historical data is passed through the trained model once more, along with the unknown sample, in order to track (or record) the leaf steps of the unknown sample. The record of these steps results in a new data structure.

3) For forecasts i=1 to $n_t \square \{trn, tst\}$, compute the tuple of associated leaves $L'_i$ as follows:

$$L_i^t = (\text{leaf}(h_1, \widetilde{y_1^t}), \ldots, \text{leaf}(h_m, \widetilde{y_m^t}))$$

where leaf is a function that gives the leaf of the tree the prediction falls into.

4) For trees i=1 to m, group the train set predictions by leaf:

$$G_i = (\{\widetilde{y_p^{trn}} | L_{p,1}^{trn}=1\}, \ldots, \{\widetilde{y_r^{trn}} | L_{r,1}^{trn}=\text{Leaves}(h_i)\}); p, r \in \{1, \ldots, n_{trn}\}$$

5) For test set predictions, i=1 to $n_{tst}$:

5.1) Determine a multiset of related train set predictions:

$$R_i = G_{1, L_{i,1}^{tst}} \cup \ldots \cup G_{m, L_{i,m}^{tst}}$$

5.2) Determine the top k elements in $R_i$ by occurrence $(e_{max, 1}, \ldots, e_{max, k})$, and the element $e_{min}$ with the smallest number of occurrences, k is a specifiable parameter.

5.3) Add each element $e_{max, j}$, $j \square \{1, \ldots, k\}$ to the multiset of representative elements $R^*_i$ for count $(e_{max, j}, R_i)$–count $(e_{min}, R_i)$ times, where count is a function that gives the number of occurrences of the element in the multiset.

5.4) Estimate the probability density function of the prediction, $f_i$, by applying a Gaussian Kernel Density Estimation (KDE) to the multiset of representative elements $R^*_i$ using a specifiable bandwidth computation method.

5.5) Derive a quantile function $F_i^{-1}$ from $f_i$ and generate quantile predictions $\widetilde{u^{test}_{i,q}} = F_i^{-1}(q)$ for each quantile q of interest.

Figure 4:
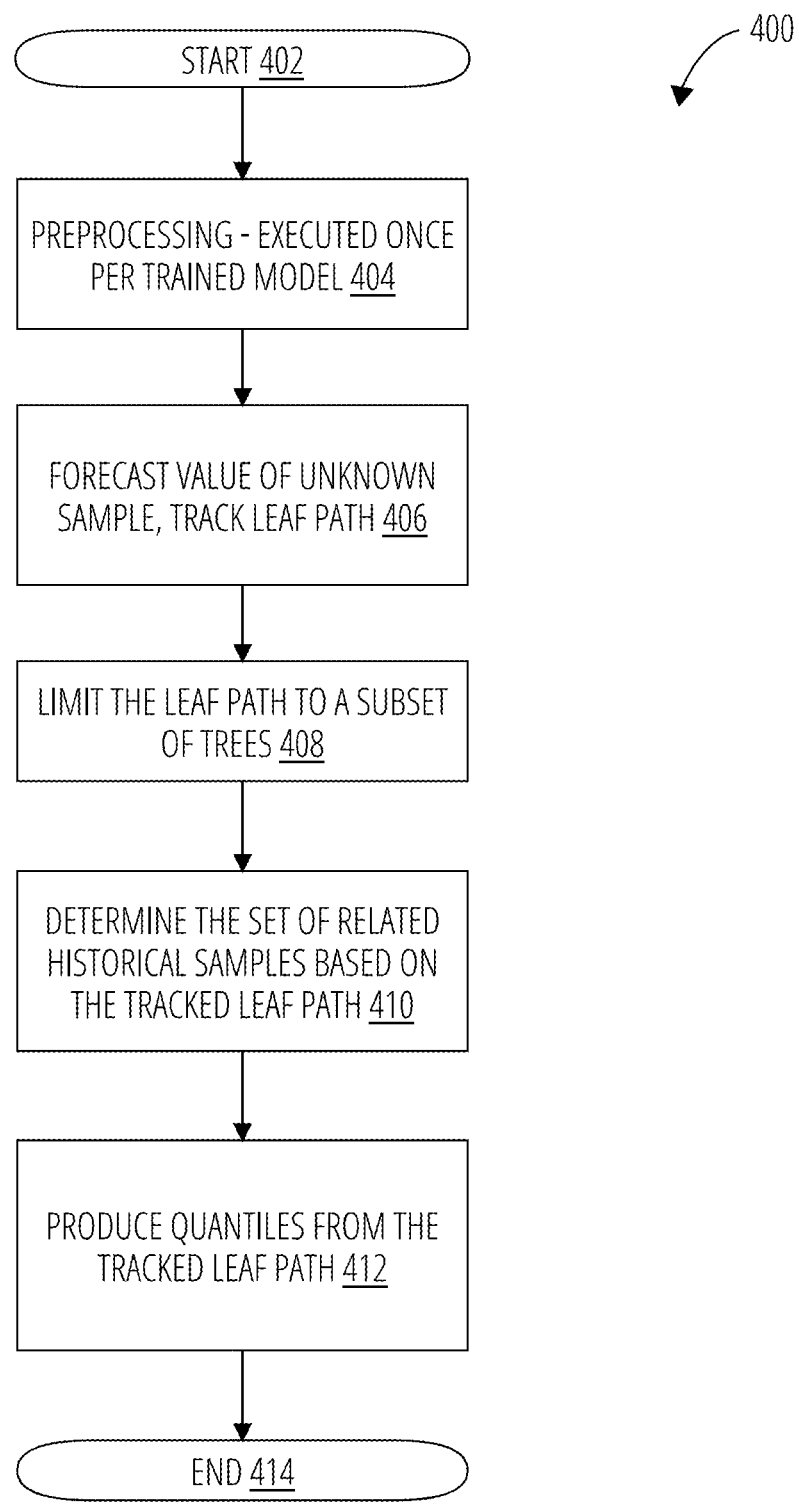
FIG. 4 illustrates a flowchart for an uncertainty estimation from a trained model in accordance with one embodiment.

FIG. 4 illustrates a flowchart 400 for an uncertainty estimation from a trained model in accordance with one embodiment.

The first step is pre-processing at block 404. This step is executed once per trained model. An embodiment of this step is further described in FIG. 5. With respect to the example shown in FIG. 3, there is only one trained model that comprises two trees: Tree 202 and Tree 212. However, each trained model can be chosen from among the following: a simple decision tree for regression, or a more complex ensemble of several trees, such as random forest or gradient boosting.

Following the pre-processing step, a value of an unknown sample is forecast at block 406. In addition, the leaf path of the forecast of the unknown sample is tracked. With reference to the example shown in FIG. 3, the leaf path of sample X is shown in Tracking Table 302.

Once the leaf path is tracked, it is limited to a subset of trees at block 408. Since only two trees are shown in the example in FIG. 3, there is no need to limit the subset of trees, and all two trees are used in the analysis in the example shown in FIG. 3. In practical examples, there can be at least thousands of trees, with possibility of redundancies between trees. In order to save resources and enhance efficiency, a subset of trees is chosen for further analysis. In some embodiments, the subset includes roughly 10%-20%, or roughly 10%-15%, or roughly 10% of the trees. Depending on the complexity of the arrangement of trees in the trained model, this subset can include the last 'N' trees of a trained model in some embodiments. In other embodiments, this subset can be a random set of 'N' trees in a trained model. As such, by reducing the number of trees in the analysis, the number of leaf paths of the unknown sample is also limited to the subset of trees.

Figure 6:
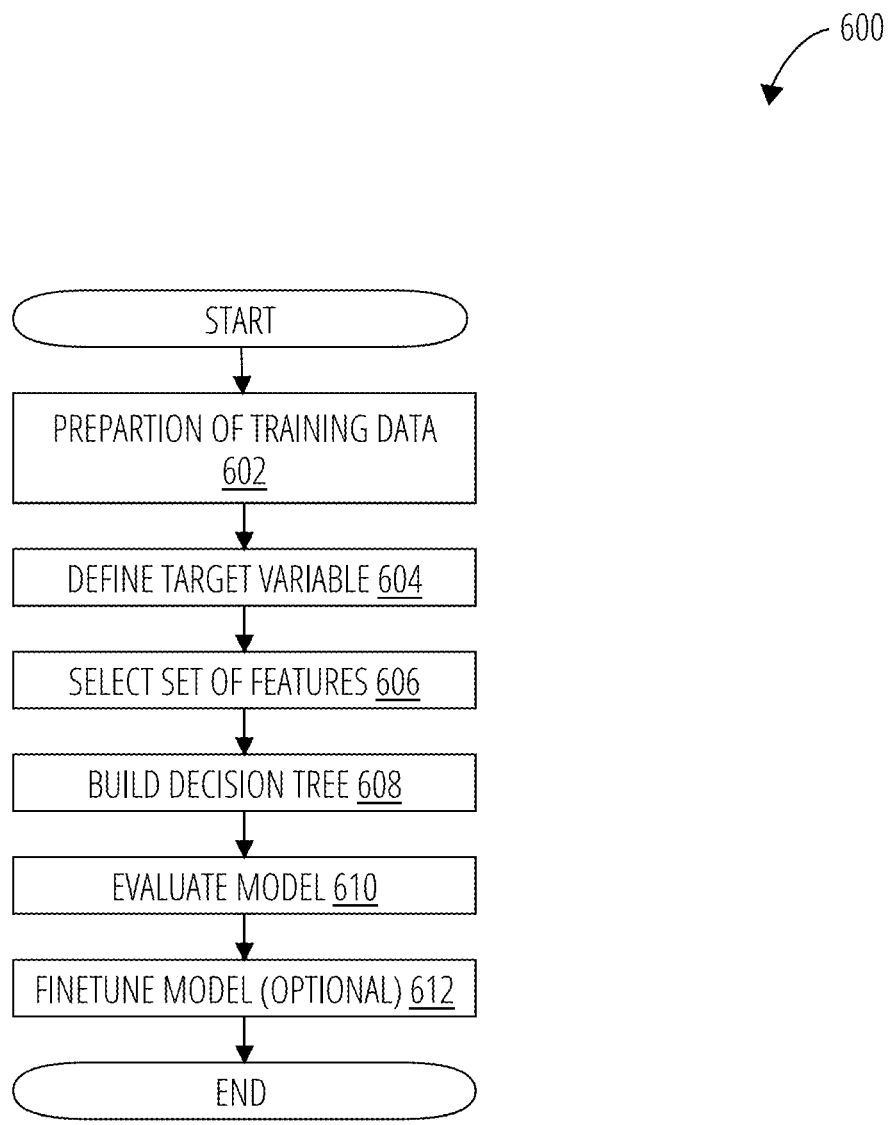
FIG. 6 illustrates a flowchart for training a decision tree machine-learning model in accordance with one embodiment.

The set of related historical samples based on the tracked leaf path of the unknown sample, is determined at block 410; an embodiment of this step which is further described in FIG. 6. Finally, quantiles are produced from the tracked leaf path at block 412; an embodiment of this step which is further described in FIG. 7.

Figure 5:
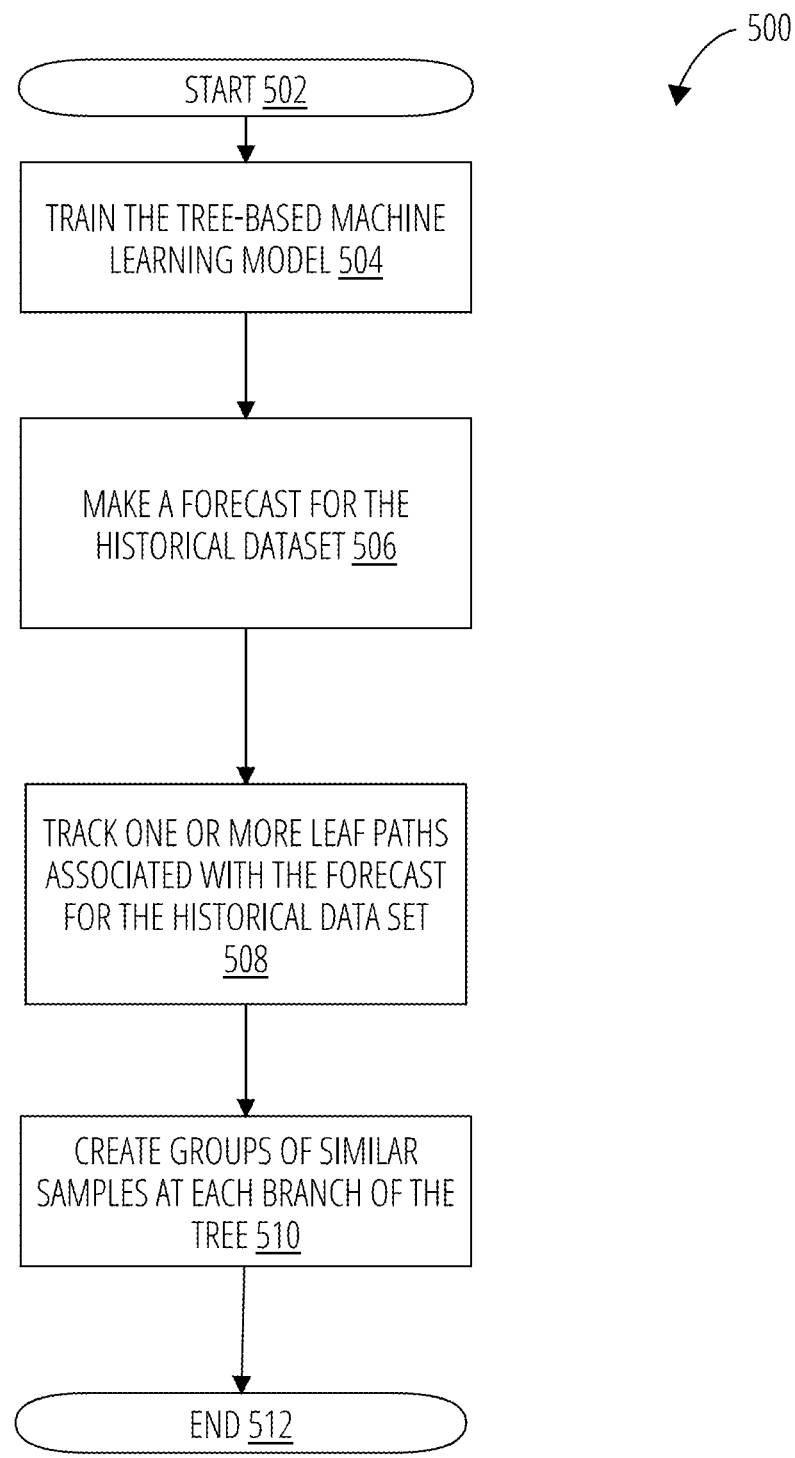
FIG. 5 illustrates a flowchart for preprocessing in accordance with one embodiment.

FIG. 5 illustrates a flowchart 500 for preprocessing in accordance with one embodiment.

The preprocessing shown in block 404 (of FIG. 4) can be executed as follows. First, a tree-based machine learning model is trained at block 504; the training step is described further in FIG. 6.

Subsequently, at block 506, a forecast for the historical data set is made, while keeping track of the path taken by the forecast of each sample in the historical data set at block 508. For example, with reference to FIG. 3, there are five samples in the historical data set: 1, 2, 3, 4 and 5. Sample #1 follows the Tree 202 leaf path: Leaf 204, Leaf 208, and is forecast to wind up in Leaf 208 of Tree 202; while it follows the Tree 212 leaf path: Leaf 216 and Leaf 218, and is forecast to wind up in Leaf 218. Sample #2 follows the Tree 202 leaf path: Leaf 206, and is forecast to wind up in Leaf 206 of Tree 202; while it follows the Tree 212 leaf path: Leaf 216 and Leaf 218, and is forecast to wind up in Leaf 218. Sample #3 follows the Tree 202 leaf path: Leaf 206, and is forecast to wind up in Leaf 206 of Tree 202; while it follows the Tree 212 leaf path: Leaf 214, and is forecast to wind up in Leaf 214. Sample #4 follows the Tree 202 leaf path: Leaf 204 and Leaf 210, and is forecast to wind up in Leaf 210 of Tree 202; while it follows the Tree 212 leaf path: Leaf 216 and Leaf 220, and is forecast to wind up in Leaf 220. Sample #5 follows the Tree 202 leaf path: Leaf 206, and is forecast to wind up in Leaf 206 of Tree 202; while it follows the Tree 212 leaf path: Leaf 214, and is forecast to wind up in Leaf 214.

At block 510, groups of similar samples in the historical data set are created at each branch of the tree-based machine learning model. That is, "similar samples" refers to samples which fall into the same leaf. For example, with reference to FIG. 3: in Tree 202 at the first branch, samples 2, 3 and 5 are grouped together at Leaf 206 and samples 1 and 4 are grouped at Leaf 204; while at the second branch, sample 1 is grouped at Leaf 208, while sample 4 is grouped at Leaf 210. In Tree 212 at the first branch, samples 3 and 5 are grouped together at Leaf 214 and samples 1, 2 and 4 are grouped at Leaf 216; while at the second branch, samples 1 and 2 are grouped together at Leaf 218, while sample 4 is grouped at Leaf 220.

Training of a machine-learning decision tree model is further described in FIG. 6.

FIG. 6 illustrates a flowchart 600 for training a decision tree machine-learning model in accordance with one embodiment.

At block 602, the training data is prepared. This can include cleaning, preprocessing, and splitting historical data into training and testing sets. Next, at block 604, the target variable is defined. That is, the variable that is going to be forecast, is identified. This can include, for example, a class label or a continuous value. Feature selection takes place at block 606. Here, a set of features are selected, that are relevant to the target variable and can provide an information gain or a reduction in uncertainty.

At block 608, a decision tree is built. This may include: starting with the root node, split the data recursively into smaller subsets using the selected features until a stopping criterion is met. The stopping criterion can be based on a maximum depth of the tree, a minimum number of samples required to split a node, or other criteria. Finally, at block 610, the trained machine-learning model is evaluated. The model's performance can be evaluated on the testing data using appropriate metrics such as accuracy, precision, recall, F1 score, mean-squared error, or other metrics known in the art. The model can be optionally tuned at block 612, by adjusting hyperparameters, selecting different features or combinations of features, or using ensemble methods. The trained decision tree model is ready to forecast on new data.

Figure 7:
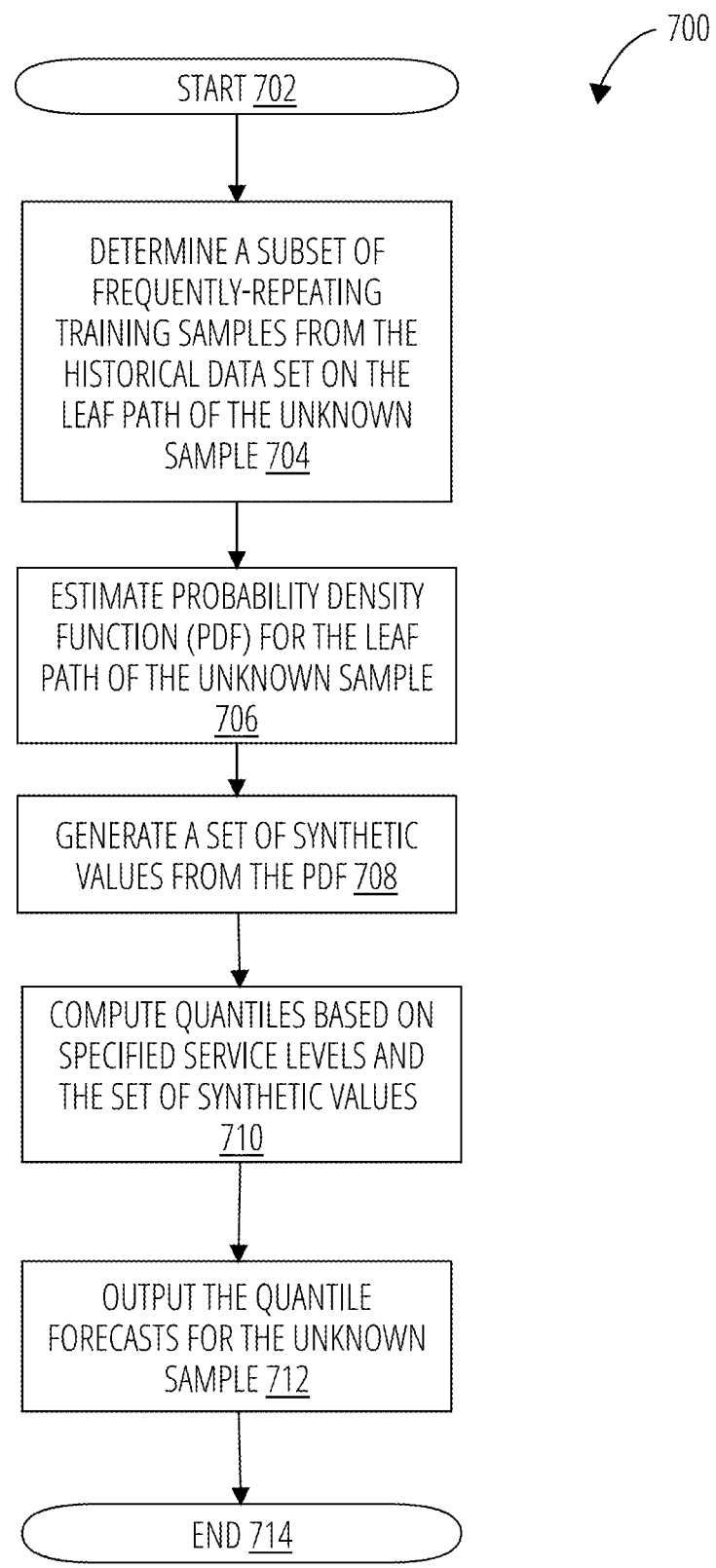
FIG. 7 illustrates a flowchart for producing quantiles from a prediction in accordance with one embodiment.

FIG. 7 illustrates a flowchart for producing quantiles from a prediction in accordance with one embodiment.

The production of quantiles shown in block 412 (of FIG. 4) can be executed as follows. First, a subset of frequently-repeating training samples from the historical data set on the leaf path of the unknown sample, is determined at block 704. For example, with reference to the example in FIG. 3, samples 1 and 4 can be a subset of frequently-repeating training samples that are on the leaf path of sample 'X': each occurs three times (whereas sample #2 occurs only once, and thus may be excluded from this subset).

Next, a probability density function for the leaf path of the unknown sample is estimated at block 706. For example, with reference to the example in FIG. 3, the probability density function is represented by probability function 306.

Next, a set of synthetic values is generated from the probability density function at block 708. For example, with reference to the example in FIG. 3, the set of synthetic values can be a large number of values, such as 23, 50, 33, 34, 41, until a few hundred synthetic values are selected. Each synthetic value, according to the probability distribution function, has an associated probability. For example, synthetic sample of 23 has an estimated probability close to that of value 20, which is roughly 18%. With a large number of synthetic values, one can calculate what values are in the top 1%, or top 20%, and thus obtain quantiles. The quantiles are thus based on a large enough number of synthetic samples.

With this information, quantiles based on specified service levels and the set of synthetic values, can be computed at block 710. Finally, a quantile forecast (for the unknown sample) is output at block 712.

The systems and methods disclosed herein can incorporate an optimization module in the case where an optimization is requested for a set of stores.

A variety of optimization libraries may be used. In some embodiments, a Mystic optimization library is used (https://mystic.readthedocs.io/en/latest/), which allows for quickly finding solutions to optimization problems using constraints through multiple solvers (local and global algorithms can be used here; non-limiting examples include the Nelder-Mead method). An objective function is computed (for example, the average service level across stores given shipped quantities) through probability distributions provided by the systems and methods disclosed herein. Furthermore, the sum of all quantities is constrained by the available stock at the distribution center serving that set of stores. The solution can be returned as a list of quantities, where the number of quantities is equal to the number of stores.

Figure 8:
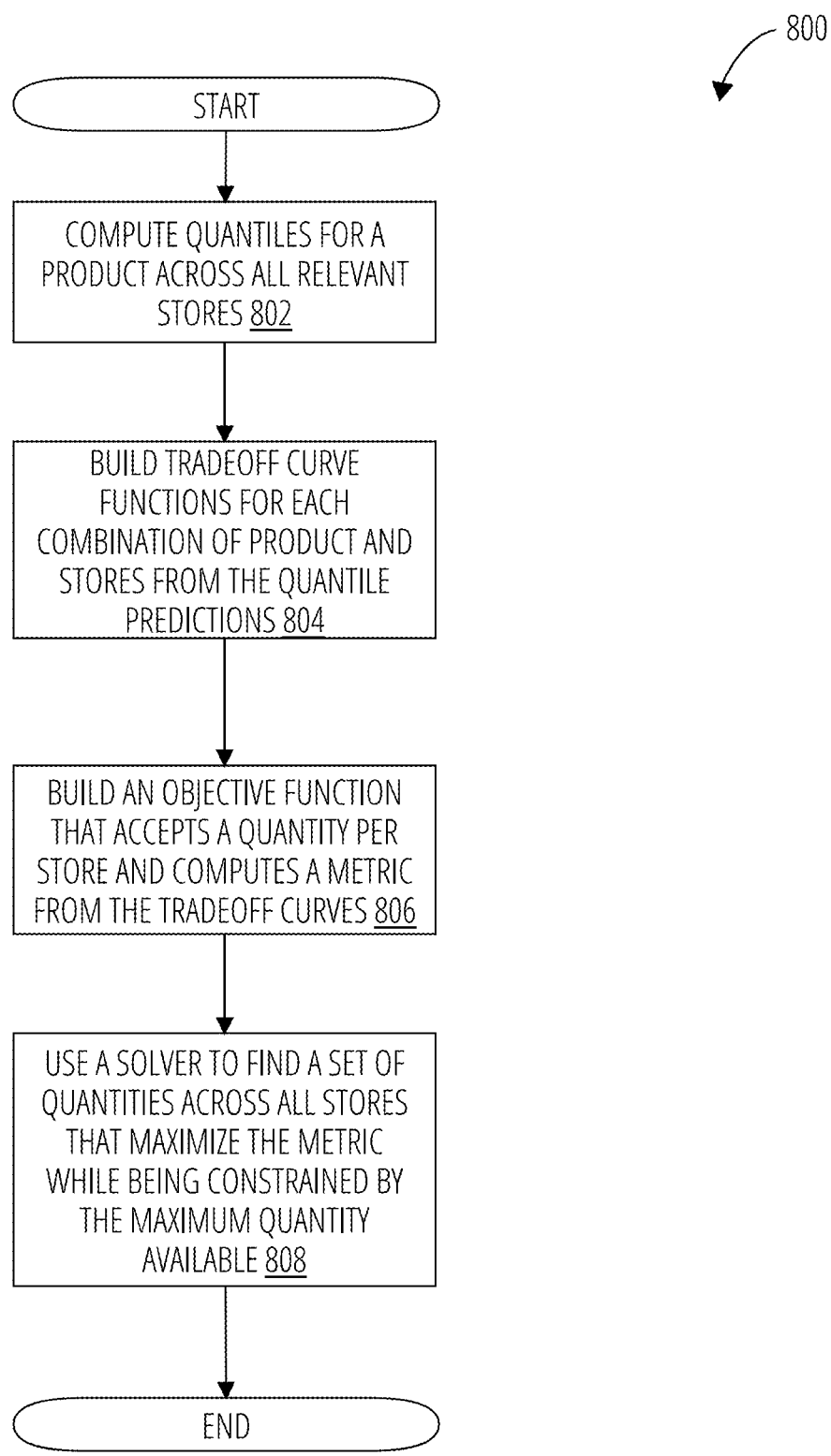
FIG. 8 illustrates a flowchart for optimization of service levels in accordance with one embodiment.

FIG. 8 illustrates a flowchart for optimization of service levels in accordance with one embodiment.

The flowchart shown in FIG. 8 illustrates an embodiment of optimization of service levels. At block 802, quantiles for a product can be computed across all relevant stores. As an example, two-hundred quantiles between the 50th and 100th percentiles can be computed.

Next, at block 804, construct tradeoff curve functions for each combination of product and stores from the quantile predictions. As an example, such construction can occur with piecewise linear interpolation splines, or other methods.

At block 806, an objective function can be constructed, that accepts a quantity per store and computes an objective metric from the tradeoff curves. The metric can be, for example, an average service level. That is, the average chance of not stocking out.

At block 808, a solver can be used to find a set of quantities across all stores that maximize the metric while being constrained by the maximum quantity available. That is, the stock available at a distribution center serving all the relevant stores. An example of a solver is one that finds the maximum or minimum of a function in a multidimensional space. In addition, the solver may use a direct search method that may be applied to nonlinear optimization problems. An example of a solver that may be used is one that uses the Nelder-Mead method.

Figure 9:
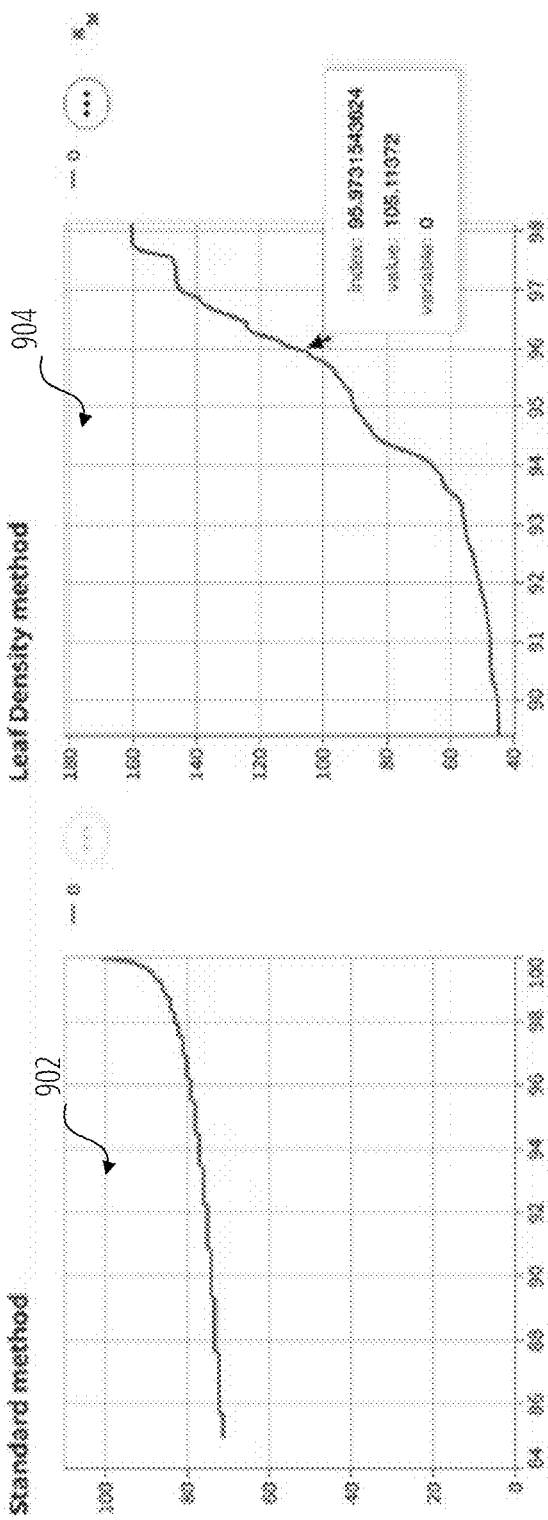
FIG. 9 illustrates an example of a trade-off curve in accordance with one embodiment.

FIG. 9 illustrates an example of a trade-off curve in accordance with one embodiment. The improvement of the leaf density method 904 over the standard method 902 is clearly shown.

Example of a Typical Problem and its Solution

In this example, there are five stores, each of which is served by one distribution center. The distribution center has a maximum of 2000 units of pencils to ship during the current week to the five stores. A promotion on pencils has been ongoing as of the week prior, and will finish in two weeks. In addition, high school students are returning to school next week. Those two pieces of information are data characterizing the time period of interest (this week). In addition, there is already a forecast for this week's pencil consumption for each store (for example: 500, 400, 300, 700, 200, respectively, for a total of 1500 pencils).

One solution would be to send exactly as many pencils required by each store (for a total of 1500 pencils, within the constraint of 2000). However, forecasts can be inaccurate and safety stocks should be included to make sure that the opportunity for extra sales is not missed. The systems and methods disclosed herein can use the data and the trained forecast model to produce five probability distributions of potential sales (one for each store). Furthermore, the probability distribution can be queried for multiple quantiles that can be equated to service levels (80th quantile of demand can correspond to a service level of 80% at that store).

At this point, there are five ranges of quantiles describing the stock quantities needed to reach different quantiles (10 units for the 5th quantile, 25 units for the 10th quantile, etc.). Those are tradeoff curves (quantities required per quantile) where a planner can examine the additional quantity required as the quantiles increase. This is actionable information for the planner in a supply chain context.

Optionally, if a planner wants to get the highest average service level across all five stores, the optimization software would see all five ranges of quantiles as well as the constraint (an inventory of 2000 units at the distribution center), and would produce the solution that best uses the maximum number of units, distributing the 2000 units to the 5 stores (e.g. 700, 500, 250, 650, 300) indicating the associated service levels (e.g. 70%, 72%, 71%, 70%, 73% for an average of 71.2%). That solution provides the planner with the safety stock quantities for each store to best utilize the inventory.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
pre-processing, by a processor, a historical data set the pre-processing executed once per trained machine-learning model;
forecasting, by the processor, a value of an unknown sample while tracking a leaf path of the unknown sample;
limiting, by the processor, the leaf path of the unknown sample to a subset of trees in each trained-machine model;
determining, by the processor, a set of related historical samples based on the leaf path of the unknown sample; and
determining, by the processor, a set of quantiles from the leaf path of the unknown sample.

2. The computer-implemented method of claim 1, wherein pre-processing the historical data set comprises:
training, by the processor, a tree-based machine learning model;
making, by the processor, a forecast for the historical data set;
tracking, by the processor, one or more leaf paths associated with the forecast for the historical data set; and
creating, by the processor, a group of similar samples in the historical data set at each branch of the tree-based machine learning model.

3. The computer-implemented method of claim 2, wherein training the tree-based model comprises:
preparing, by the processor, the historical data set for training;
defining, by the processor, a target variable;
selecting, by the processor, a set of features; and
building, by the processor, a decision tree.

4. The computer-implemented method of claim 1, wherein determining the set of related historical samples comprises:
determining, by the processor, a subset of frequently-repeating training samples from the historical data set, on the leaf path of the unknown sample;
estimating, by the processor, a probability density function for the leaf path of the unknown sample;
generating, by the processor, a set of synthetic values from the probability density function;
computing, by the processor, the quantiles based on specified service levels and the set of synthetic values; and
outputting, by the processor, a quantile forecast for the unknown sample.

5. The computer-implemented method of claim 1, further comprising loading inventory in accordance with the set of quantiles.

6. A system comprising:
a processor; and
a memory storing instructions that, when executed by the processor, configure the system to:
pre-process, by the processor, a historical data set the pre-processing executed once per trained machine-learning model;
forecast, by the processor, a value of an unknown sample while tracking a leaf path of the unknown sample;
limit, by the processor, the leaf path of the unknown sample to a subset of trees in each trained-machine model;
determine, by the processor, a set of related historical samples based on the leaf path of the unknown sample; and
determine, by the processor, a set of quantiles from the leaf path of the unknown sample.

7. The system of claim 6, wherein when pre-processing the historical data set, the system is further configured to:
train, by the processor, a tree-based machine learning model;
make, by the processor, a forecast for the historical data set;
track, by the processor, one or more leaf paths associated with the forecast for the historical data set; and
create, by the processor, a group of similar samples in the historical data set at each branch of the tree-based machine learning model.

8. The system of claim 7, wherein when training the tree-based model, the system is further configured to:
prepare, by the processor, the historical data set for training;
define, by the processor, a target variable;
select, by the processor, a set of features; and
build, by the processor, a decision tree.

9. The system of claim 6, wherein when determining the set of related historical samples, the system is further configured to:
determine, by the processor, a subset of frequently-repeating training samples from the historical data set, on the leaf path of the unknown sample;
estimate, by the processor, a probability density function for the leaf path of the unknown sample;
generate, by the processor, a set of synthetic values from the probability density function;
compute, by the processor, the quantiles based on specified service levels and the set of synthetic values; and
output, by the processor, a quantile forecast for the unknown sample.

10. The system of claim 6, wherein inventory is loaded in accordance with the set of quantiles.

11. A non-transitory computer-readable storage medium, the computer-readable storage medium including instructions that when executed by a computer, cause the computer to:
pre-process, by a processor, a historical data set the pre-processing executed once per trained machine-learning model;
forecast, by the processor, a value of an unknown sample while tracking a leaf path of the unknown sample;
limit, by the processor, the leaf path of the unknown sample to a subset of trees in each trained-machine model;
determine, by the processor, a set of related historical samples based on the leaf path of the unknown sample; and
determine, by the processor, a set of quantiles from the leaf path of the unknown sample.

12. The computer-readable storage medium of claim 11, wherein when pre-processing the historical data set, the instructions that when executed by the computer, further cause the computer to:
train, by the processor, a tree-based machine learning model;
make, by the processor, a forecast for the historical data set;
track, by the processor, one or more leaf paths associated with the forecast for the historical data set; and
create, by the processor, a group of similar samples in the historical data set at each branch of the tree-based machine learning model.

13. The computer-readable storage medium of claim 12, wherein when training the tree-based model, the instructions that when executed by the computer, further cause the computer to:
prepare, by the processor, the historical data set for training;
define, by the processor, a target variable;
select, by the processor, a set of features; and
build, by the processor, a decision tree.

14. The computer-readable storage medium of claim 11, wherein when determining the set of related historical samples, the instructions that when executed by the computer, further cause the computer to:
determine, by the processor, a subset of frequently-repeating training samples from the historical data set, on the leaf path of the unknown sample;
estimate, by the processor, a probability density function for the leaf path of the unknown sample;
generate, by the processor, a set of synthetic values from the probability density function;
compute, by the processor, the quantiles based on specified service levels and the set of synthetic values; and
output, by the processor, a quantile forecast for the unknown sample.

15. The computer-readable storage medium of claim 11, wherein inventory is loaded in accordance with the set of quantiles.

16. A computer-implemented method, comprising:
pre-processing, by a processor, a historical data set associated with a plurality of stores and a plurality of products, the pre-processing executed once per trained machine-learning model;
forecasting, by the processor, a value of an unknown sample while tracking a leaf path of the unknown sample;
limiting, by the processor, the leaf path of the unknown sample to a subset of trees in each trained-machine model;
determining, by the processor, a set of related historical samples based on the leaf path of the unknown sample;
determining, by the processor, a set of quantiles across the plurality of stores from the leaf path of the unknown sample;
constructing, by the processor, one or more tradeoff curve functions for each combination of the plurality of products and stores from the set of quantiles;
constructing, by the processor, an objective function that accepts a quantity per store and computes a metric from the one or more tradeoff curves; and
determining, by the processor, a set of quantities across the plurality of stores that maximize the metric while being constrained by a maximum available quantity.

17. The computer-implemented method of claim 16, wherein pre-processing the historical data set comprises:
training, by the processor, a tree-based machine learning model;
making, by the processor, a forecast for the historical data set;
tracking, by the processor, one or more leaf paths associated with the forecast for the historical data set; and
creating, by the processor, a group of similar samples in the historical data set at each branch of the tree-based machine learning model.

18. The computer-implemented method of claim 17, wherein training the tree-based model comprises:
preparing, by the processor, the historical data set for training;
defining, by the processor, a target variable;
selecting, by the processor, a set of features; and
building, by the processor, a decision tree.

19. The computer-implemented method of claim 16, wherein determining the set of related historical samples comprises:
determining, by the processor, a subset of frequently-repeating training samples from the historical data set, on the leaf path of the unknown sample;
estimating, by the processor, a probability density function for the leaf path of the unknown sample;
generating, by the processor, a set of synthetic values from the probability density function;
computing, by the processor, the quantiles based on specified service levels and the set of synthetic values; and
outputting, by the processor, a quantile forecast for the unknown sample.

20. The computer-implemented method of claim 16, further comprising loading inventory at each of the plurality of stores in accordance with the set of quantities.

21. A system comprising:
a processor; and
a memory storing instructions that, when executed by the processor, configure the system to:
pre-process, by the processor, a historical data set associated with a plurality of stores and a plurality of products, the pre-processing executed once per trained machine-learning model;
forecast, by the processor, a value of an unknown sample while tracking a leaf path of the unknown sample;
limit, by the processor, the leaf path of the unknown sample to a subset of trees in each trained-machine model;
determine, by the processor, a set of related historical samples based on the leaf path of the unknown sample;
determine, by the processor, a set of quantiles across the plurality of stores from the leaf path of the unknown sample;
construct, by the processor, one or more tradeoff curve functions for each combination of the plurality of products and stores from the set of quantiles;
construct, by the processor, an objective function that accepts a quantity per store and computes a metric from the one or more tradeoff curves; and
determine, by the processor, a set of quantities across the plurality of stores that maximize the metric while being constrained by a maximum available quantity.

22. The system of claim 21, wherein when pre-processing the historical data set, the system is further configured to:
train, by the processor, a tree-based machine learning model;
make, by the processor, a forecast for the historical data set;

track, by the processor, one or more leaf paths associated with the forecast for the historical data set; and create, by the processor, a group of similar samples in the historical data set at each branch of the tree-based machine learning model.

23. The system of claim 22, wherein when training the tree-based model, the system is further configured to:

prepare, by the processor, the historical data set for training;

define, by the processor, a target variable;

select, by the processor, a set of features; and build, by the processor, a decision tree.

24. The system of claim 21, wherein when determining the set of related historical samples, the system is further configured to:

determine, by the processor, a subset of frequently-repeating training samples from the historical data set, on the leaf path of the unknown sample;

estimate, by the processor, a probability density function for the leaf path of the unknown sample;

generate, by the processor, a set of synthetic values from the probability density function;

compute, by the processor, the quantiles based on specified service levels and the set of synthetic values; and output, by the processor, a quantile forecast for the unknown sample.

25. The system of claim 21, wherein inventory is loaded at each of the plurality of stores in accordance with the set of quantities.

26. A non-transitory computer-readable storage medium, the computer-readable storage medium including instructions that when executed by a computer, cause the computer to:

pre-process, by a processor, a historical data set associated with a plurality of stores and a plurality of products, the pre-processing executed once per trained machine-learning model;

forecast, by the processor, a value of an unknown sample while tracking a leaf path of the unknown sample;

limit, by the processor, the leaf path of the unknown sample to a subset of trees in each trained-machine model;

determine, by the processor, a set of related historical samples based on the leaf path of the unknown sample;

determine, by the processor, a set of quantiles across the plurality of stores from the leaf path of the unknown sample;

construct, by the processor, one or more tradeoff curve functions for each combination of the plurality of products and stores from the set of quantiles;

construct, by the processor, an objective function that accepts a quantity per store and computes a metric from the one or more tradeoff curves; and determine, by the processor, a set of quantities across the plurality of stores that maximize the metric while being constrained by a maximum available quantity.

27. The computer-readable storage medium of claim 26, wherein when pre-processing the historical data set, the instructions that when executed by the computer, further cause the computer to:

train, by the processor, a tree-based machine learning model;

make, by the processor, a forecast for the historical data set;

track, by the processor, one or more leaf paths associated with the forecast for the historical data set; and create, by the processor, a group of similar samples in the historical data set at each branch of the tree-based machine learning model.

28. The computer-readable storage medium of claim 27, wherein when training the tree-based model, the instructions that when executed by the computer, further cause the computer to:

prepare, by the processor, the historical data set for training;

define, by the processor, a target variable;

select, by the processor, a set of features; and build, by the processor, a decision tree.

29. The computer-readable storage medium of claim 26, wherein when determining the set of related historical samples, the instructions that when executed by the computer, further cause the computer to:

determine, by the processor, a subset of frequently-repeating training samples from the historical data set, on the leaf path of the unknown sample;

estimate, by the processor, a probability density function for the leaf path of the unknown sample;

generate, by the processor, a set of synthetic values from the probability density function;

compute, by the processor, the quantiles based on specified service levels and the set of synthetic values; and output, by the processor, a quantile forecast for the unknown sample.

30. The computer-readable storage medium of claim 26, wherein inventory is loaded at each of the plurality of stores in accordance with the set of quantities.

* * * * *